US012581523B2

(12) United States Patent
Han et al.

(10) Patent No.: US 12,581,523 B2
(45) Date of Patent: Mar. 17, 2026

(54) METHOD AND APPARATUS FOR CONTROLLING SIDELINK AND UPLINK TRANSMISSIONS OF NR SUPPORTING V2X

(71) Applicant: Lenovo (Beijing) Limited, Beijing (CN)

(72) Inventors: Jing Han, Chaoyang District (CN); Lianhai Wu, Chaoyang (CN); Haiming Wang, Xicheng District (CN); Jie Shi, Haidian District (CN); Jie Hu, Changping District (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 17/628,177

(22) PCT Filed: Jul. 18, 2019

(86) PCT No.: PCT/CN2019/096554

§ 371 (c)(1),
(2) Date: Jan. 18, 2022

(87) PCT Pub. No.: WO2021/007852

PCT Pub. Date: Jan. 21, 2021

(65) Prior Publication Data

US 2022/0264590 A1    Aug. 18, 2022

(51) Int. Cl.
*H04W 72/54* (2023.01)
*H04L 1/1825* (2023.01)
*H04W 72/566* (2023.01)

(52) U.S. Cl.
CPC ........... *H04W 72/54* (2023.01); *H04L 1/1825* (2013.01); *H04W 72/569* (2023.01)

(58) Field of Classification Search
None
See application file for complete search history.

(56) References Cited

U.S. PATENT DOCUMENTS

2017/0367087 A1    12/2017 Seo et al.
2018/0279229 A1*    9/2018 Dinan .................. H04W 72/21
(Continued)

FOREIGN PATENT DOCUMENTS

CN        108207032 A    6/2018
CN        109478991 A    3/2019
(Continued)

OTHER PUBLICATIONS

CATT, Prioritization rule for SR-PUSCH collision, 3GPP TSG-RAN WG2 Meeting #105bis, Agenda Item 11.7.3, R2-1903144, Xi'an, China, Apr. 8-12, 2019 (Year: 2019).*
(Continued)

*Primary Examiner* — Benjamin Lamont
(74) *Attorney, Agent, or Firm* — FIG. 1 Patents

(57) ABSTRACT

The present application is related to a method performed by user equipment (UE). The method includes: determining whether a uplink (UL) transmission and a sidelink (SL) transmission overlap in time domain; and in response to the UL transmission and the SL transmission overlapping in time domain, determining, based on quality of service (QoS) requirements of the UL transmission and the SL transmission, transmitting which one of the UL transmission and the SL transmission and not transmitting the other one of the UL transmission and the SL transmission.

20 Claims, 11 Drawing Sheets

(56)     References Cited

U.S. PATENT DOCUMENTS

| | | | | |
|---|---|---|---|---|
| 2019/0335532 | A1* | 10/2019 | Kim | H04W 72/02 |
| 2020/0045724 | A1* | 2/2020 | Lu | H04W 72/569 |
| 2021/0022170 | A1* | 1/2021 | Lu | H04W 72/02 |
| 2021/0204301 | A1* | 7/2021 | Lee | H04W 72/566 |
| 2021/0250302 | A1* | 8/2021 | Loehr | H04L 47/32 |
| 2021/0307032 | A1* | 9/2021 | Osawa | H04W 72/1263 |

FOREIGN PATENT DOCUMENTS

| | | |
|---|---|---|
| CN | 109891987 A | 6/2019 |
| EP | 3273634 A1 | 1/2018 |
| WO | 2015139862 | 9/2015 |

OTHER PUBLICATIONS

"International Preliminary Report on Patentability", PCT Application No. PCT/CN2019/096554, Jan. 27, 2022, 5 pages.

"International Search Report and Written Opinion", PCT Application PCT/CN2019/096554, Apr. 20, 2020, 6 pages.

Ericsson , "Coexistence Between Sidelink and Uplink Transmission", 3GPP TSG-RAN WG2 #97, R2-1700948, Athens, Greece, Feb. 3, 2017, 4 pages.

19937847.2 , "Extended European Search Report", EP Application No. 19937847.2, Feb. 22, 2023, 12 pages.

Asustek , "Discussion on UL/SL TX prioritization", 3GPP TSG-RAN2 Meeting #106, R2-1906541, Reno, USA [retrieved Feb. 23, 2023]. Retrieved from the Internet <https://www.3gpp.org/ftp/TSG_RAN/WG2_RL2/TSGR2_106/Docs/?sortby=date>., May 2019, 3 Pages.

Mediatek Inc. , "Prioritization of UL and SL transmission", 3GPP TSG-RAN WG2 Meeting #106, R2-1906337, Reno, US [retrieved Feb. 24, 2023]. Retrieved from the Internet <https://www.3gpp.org/ftp/tsg_ran/WG2_RL2/TSGR2_106/Docs?sortby=namerev>, May 2019, 3 pages.

OPPO , "Left issues on MAC for NR-V2X", 3GPP TSG-RAN WG2 Meeting #106, R2-1905568, Reno, US [retrieved Feb. 23, 2023]. Retrieved from the Internet <https://www.3gpp.org/ftp/tsg_ran/WG2_RL2/TSGR2_106/Docs>., May 2019, 6 Pages.

OPPO , "Summary of [Offline#704] UL/SL prioritization", 3GPP TSG-RAN WG2 Meeting #106, R2-1908291, Reno, US [retrieved Feb. 23, 2023]. Retrieved from the Internet <https://www.3gpp.org/ftp/TSG_RAN/WG2_RL2/TSGR2_106/Docs/>., May 2019, 8 Pages.

VIVO , "Uplink and Sidelink transmission prioritization in NR V2X", 3GPP TSG-RAN WG2 Meeting #106, R2-1905847, Reno, US [retrieved Feb. 23, 2023]. Retrieved from the Internet <https://www.3gpp.org/ftp/TSG_RAN/WG2_RL2/TSGR2_106/Docs/?sortby=daterev>., May 2019, 8 Pages.

"Foreign Office Action", CN Application No. 201980098466.0, Feb. 21, 2025, 29 pages.

* cited by examiner

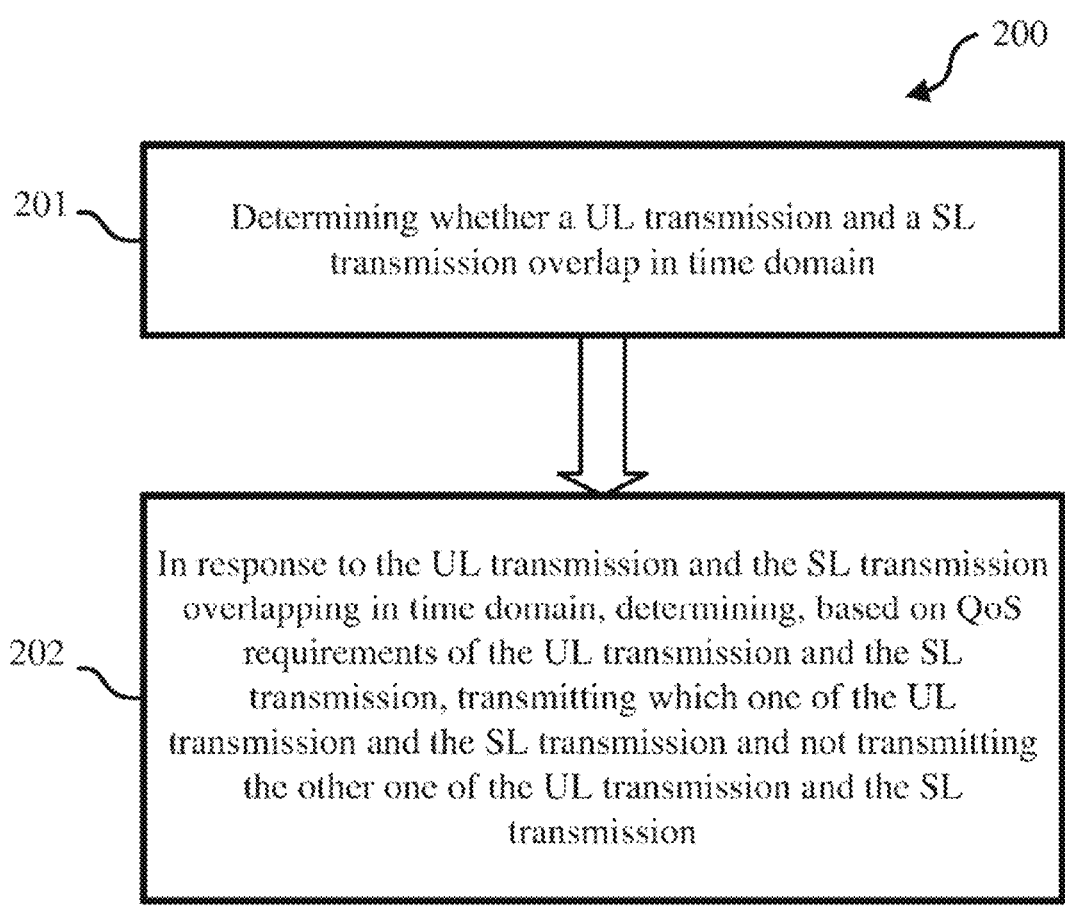

200

201 — Determining whether a UL transmission and a SL transmission overlap in time domain 202 — In response to the UL transmission and the SL transmission overlapping in time domain, determining, based on QoS requirements of the UL transmission and the SL transmission, transmitting which one of the UL transmission and the SL transmission and not transmitting the other one of the UL transmission and the SL transmission

FIG. 2

METHOD AND APPARATUS FOR CONTROLLING SIDELINK AND UPLINK TRANSMISSIONS OF NR SUPPORTING V2X

TECHNICAL FIELD

The present application generally relates to wireless communication, and more specifically relates to a method and apparatus for controlling sidelink (SL) and uplink (UL) transmissions during communication of NR (New radio) supporting Vehicle to everything (V2X).

BACKGROUND

V2X has been introduced into 5G wireless communication technology. Device-to-device (D2D) communication is applicable to public safety and commercial communication use-cases, and also to V2X scenarios. In terms of a channel structure of D2D communication, the direct link between two user equipments (UEs) is called a sidelink or a SL. Sidelink is a long-term evolution (LTE) feature introduced in 3GPP (3rd Generation Partnership Project) Release 12, and enables a direct communication between proximal UEs, and data does not need to go through a base station (BS) or core network.

In order to meet the requirements of providing relatively good performance on D2D communication, sidelink, or NR sidelink (e.g., advanced 3GPP NR (New radio) V2X service), technologies of controlling SL and UL transmissions during communication of NR V2X are developed.

SUMMARY

Some embodiments of the present application provide a method performed by user equipment (UE). The method includes: determining whether a UL transmission and a SL transmission overlap in time domain; and in response to the UL transmission and the SL transmission overlapping in time domain, determining, based on quality of service (QoS) requirements of the UL transmission and the SL transmission, transmitting which one of the UL transmission and the SL transmission and not transmitting the other one of the UL transmission and the SL transmission.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement a method performed by a UE for transmitting data.

BRIEF DESCRIPTION OF THE DRAWINGS

In order to describe the manner in which advantages and features of the present application can be obtained, a description of the present application is rendered by reference to specific embodiments thereof which are illustrated in the appended drawings. These drawings depict only exemplary embodiments of the present application and are not therefore to be considered as limiting of its scope.

FIG. 2 illustrates a flow chart of a method for controlling transmissions in accordance with some embodiments of the present application.

FIGS. 3-1 to 3-5 illustrate further flow charts of a transmission control scheme in accordance with some embodiments of the present application.

FIG. 4 illustrates another flow chart of a transmission control scheme in accordance with some embodiments of the present application.

FIG. 5 illustrates another flow chart of a transmission control scheme in accordance with some embodiments of the present application.

DETAILED DESCRIPTION

Figure 1:
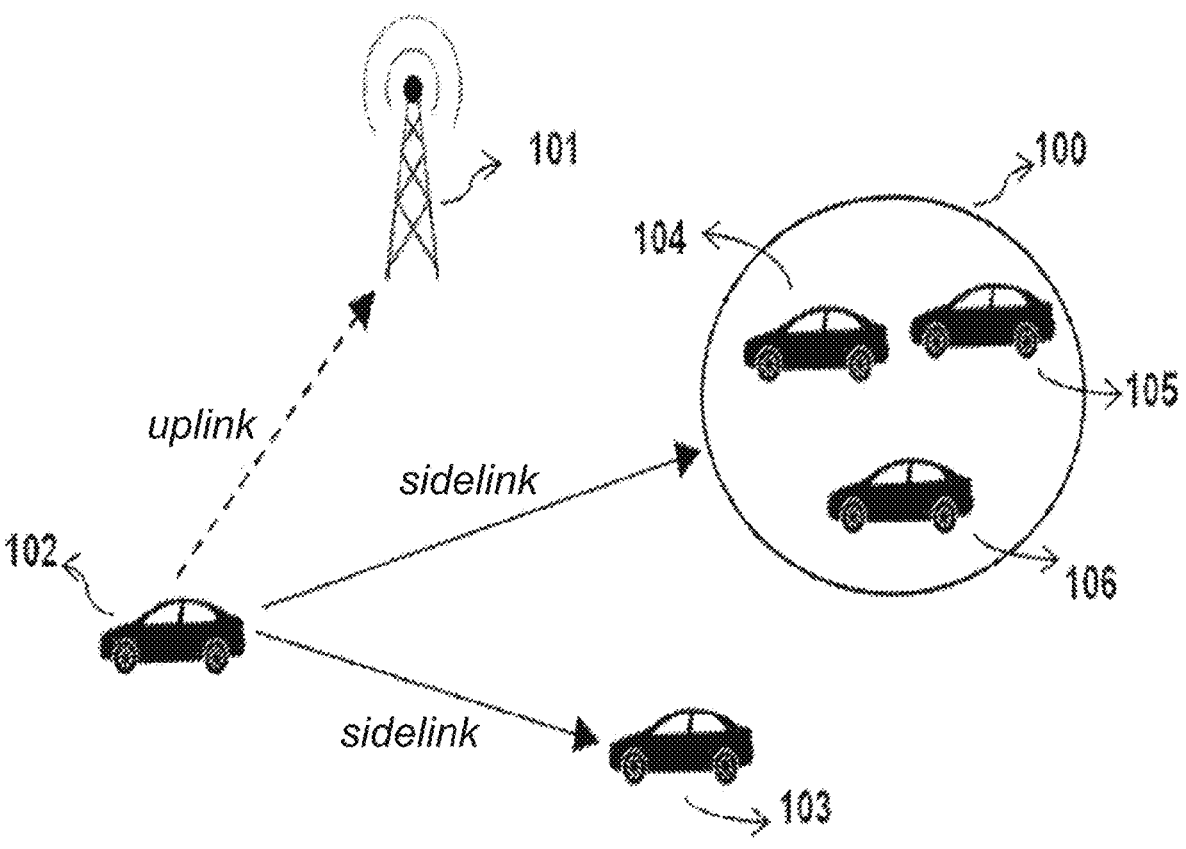
FIG. 1 illustrates an exemplary sidelink communication system in accordance with some embodiments of the present application.

The detailed description of the appended drawings is intended as a description of the currently preferred embodiments of the present application, and is not intended to represent the only form in which the present application may be practiced. It should be understood that the same or equivalent functions may be accomplished by different embodiments that are intended to be encompassed within the spirit and scope of the present application.

UE(s) under NR V2X scenario may be referred to as V2X UE(s). A V2X UE, which transmits data according to sidelink resource(s) scheduled by a base station (BS), may be referred to as a UE for transmitting, a transmitting UE, a transmitting V2X UE, a Tx UE, a V2X Tx UE, or the like. A V2X UE, which receives data according to sidelink resource(s) scheduled by a BS, may be referred to as a UE for receiving, a receiving UE, a receiving V2X UE, an Rx UE, a V2X Rx UE, or the like.

A BS under NR V2X scenario may be referred to as a base unit, a base, an access point, an access terminal, a macro cell, a Node-B, an enhanced Node B (eNB), a gNB, a Home Node-B, a relay node, a device, a remote unit, or by any other terminology used in the art. A BS may be distributed over a geographic region. Generally, a BS is a part of a radio access network that may include one or more controllers communicably coupled to one or more corresponding base stations.

A BS is generally communicably coupled to one or more packet core networks (PCN), which may be coupled to other networks, like the packet data network (PDN) (e.g., the Internet) and public switched telephone networks, among other networks. These and other elements of radio access and core networks are not illustrated but are well known generally by those having ordinary skill in the art. For example, one or more BSs may be communicably coupled to a mobility management entity (MME), a serving gateway (SGW), and/or a packet data network gateway (PGW).

A BS may serve a number of V2X UEs within a serving area, for example, a cell or a cell sector via a wireless communication link. A BS may communicate directly with one or more of V2X UEs via communication signals. For example, a BS may serve V2X UEs within a macro cell.

Sidelink (SL) communication under NR V2X scenario includes groupcast communication, unicast communication, or broadcast communication. Communications between a UE and a BS include uplink (UL) communication and downlink (DL) communication.

For UEs that have both a service on UL and a service on SL, some UE(s) cannot transmit UL transmission and SL transmission simultaneously due to a limited capability of the UE(s). For example, if a UE has only one Tx chain, when both UL and SL transmissions need to be transmitted on the Tx chain at the same time point, the UE has to merely transmit the SL transmission without transmitting the UL transmission at that time point; alternatively, the UE has to merely transmit the UL transmission without transmitting the SL transmission at that time point. In LTE standardization, in a mechanism which only considers a QoS requirement of a service on SL, when a service on SL has a higher priority than a threshold, a UL transmission will be dropped and a SL transmission will be transmitted.

In a NR V2X communication system, one case is that a V2X UE has both an URLLC service on UL and a service on SL simultaneously. The URLLC service on UL is more stringent in delay and reliability requirements than the service on SL. Thus, it is unacceptable for a V2X UE to transmit a SL transmission of the service on SL and drop a UL transmission of the URLLC service on UL. Accordingly, if the service on SL which happens simultaneously has a higher priority than a threshold, a mechanism which only considers a QoS requirement of a service on SL without considering a QoS requirement of a service on UL is not applicable. In such case, the V2X UE also needs to consider the QoS requirement of the service on UL, in order to guarantee a quality of the service on UL (for example, an URLLC service).

Given the above, in an NR V2X communication system, there is a need to consider both UL and SL QoS requirements to prioritize UL and SL transmissions. In the present application, when a UE needs to transmit both a UL transmission and a SL transmission which overlap in time domain, prioritizing the UL transmission means transmitting the UL transmission and not transmitting the SL transmission; and prioritizing the SL transmission means transmitting the SL transmission and not transmitting the UL transmission.

In some embodiments of the present application, when a UE needs to transmit both a UL transmission and a SL transmission which overlap in time domain, prioritizing the UL transmission means transmitting the UL transmission and dropping the SL transmission; and prioritizing the SL transmission means transmitting the SL transmission and dropping the UL transmission.

Some embodiments of the present application provide a mechanism for controlling SL and UL transmissions during communication of NR supporting V2X. Some embodiments of the present application provide a mechanism for determining, based on QoS requirements of UL transmission and SL transmission which overlap in time domain, transmitting which one of the UL and SL transmissions and not transmitting the other one of the UL and SL transmissions. Some embodiments of the present application provide a mechanism for comparing QoS parameters of UL and SL transmissions.

Some embodiments of the present application provide an apparatus for controlling SL and UL transmissions during communication of NR supporting V2X. Some embodiments of the present application provide an apparatus for determining, based on QoS requirements of UL transmission and SL transmission which overlap in time domain, transmitting which one of the UL and SL transmissions and not transmitting the other one of the UL and SL transmissions. Some embodiments of the present application provide an apparatus for comparing QoS parameters of UL and SL transmissions.

Embodiments of the present application may be provided in a network architecture that adopts various service scenarios, for example but is not limited to, 3GPP 3G, long-term evolution (LTE), LTE-Advanced (LTE-A), 3GPP 4G, 3GPP 5G NR (new radio), 3GPP LTE Release 12 and onwards, etc. It is contemplated that along with the 3GPP and related communication technology development, the terminologies recited in the present application may change, which should not affect the principle of the present application.

FIG. 1 illustrates an exemplary sidelink communication system in accordance with some embodiments of the present application. As shown in FIG. 1, the sidelink communication system includes a base station, i.e., BS 101, and some UEs, i.e., UE 102, UE 103, UE 104, UE 105, and UE 106. UE 102, UE 103, UE 104, UE 105, and UE 106 may be configured to perform sidelink unicast transmission, sidelink groupcast transmission, or sidelink broadcast transmission.

It is contemplated that, in accordance with some other embodiments of the present application, a sidelink communication system may include more or fewer BSs, more or fewer UEs, and more or fewer UE groupcast groups; and moreover, a UE groupcast group may include different numbers of UEs at different time, along with joining and leaving of UE(s) during sidelink communication.

It is contemplated that, in accordance with some other embodiments of the present application, names of UEs shown in FIG. 1 may be different, e.g., a Tx UE, an Rx UE, and etc. Moreover, although each UE shown in FIG. 1 is illustrated in the shape of a car, it is contemplated that a sidelink communication system may include any type of UE (e.g., a roadmap device, a cell phone, a computer, a laptop, IoT (internet of things) device or other type of device) in accordance with some other embodiments of the present application.

According to the embodiments of FIG. 1, UE 102 functions as a Tx UE. UE 102 may transmit information to BS 101 via uplink and receive control information from BS 101. UE 102 may transmit information or data via sidelink to other UE(s) within the sidelink communication system, through sidelink unicast, sidelink groupcast, or sidelink broadcast. For instance, UE 102 transmits data to UE 103 via sidelink, wherein UE 103 functions as an Rx UE. UE 104, UE 105, and UE 106 form a group of Rx UEs. Such group of Rx UEs may be referred to as a receiving group 100. UE 102 may transmit data to all UEs in the receiving group 100 via sidelink. Also, UE 102 may transmit data to UE 103 and all UEs in the receiving group 100 via sidelink simultaneously.

In some embodiments of the present application, a transmission control scheme handling a UL between a BS and a Tx UE and a SL between the Tx UE and an Rx UE is provided if the UL transmission and the SL transmission overlap in time domain. A Tx UE may determine to transmit which one of UL and SL transmissions according to the transmission control scheme implemented in the sidelink communication system.

Figures 1, 3:
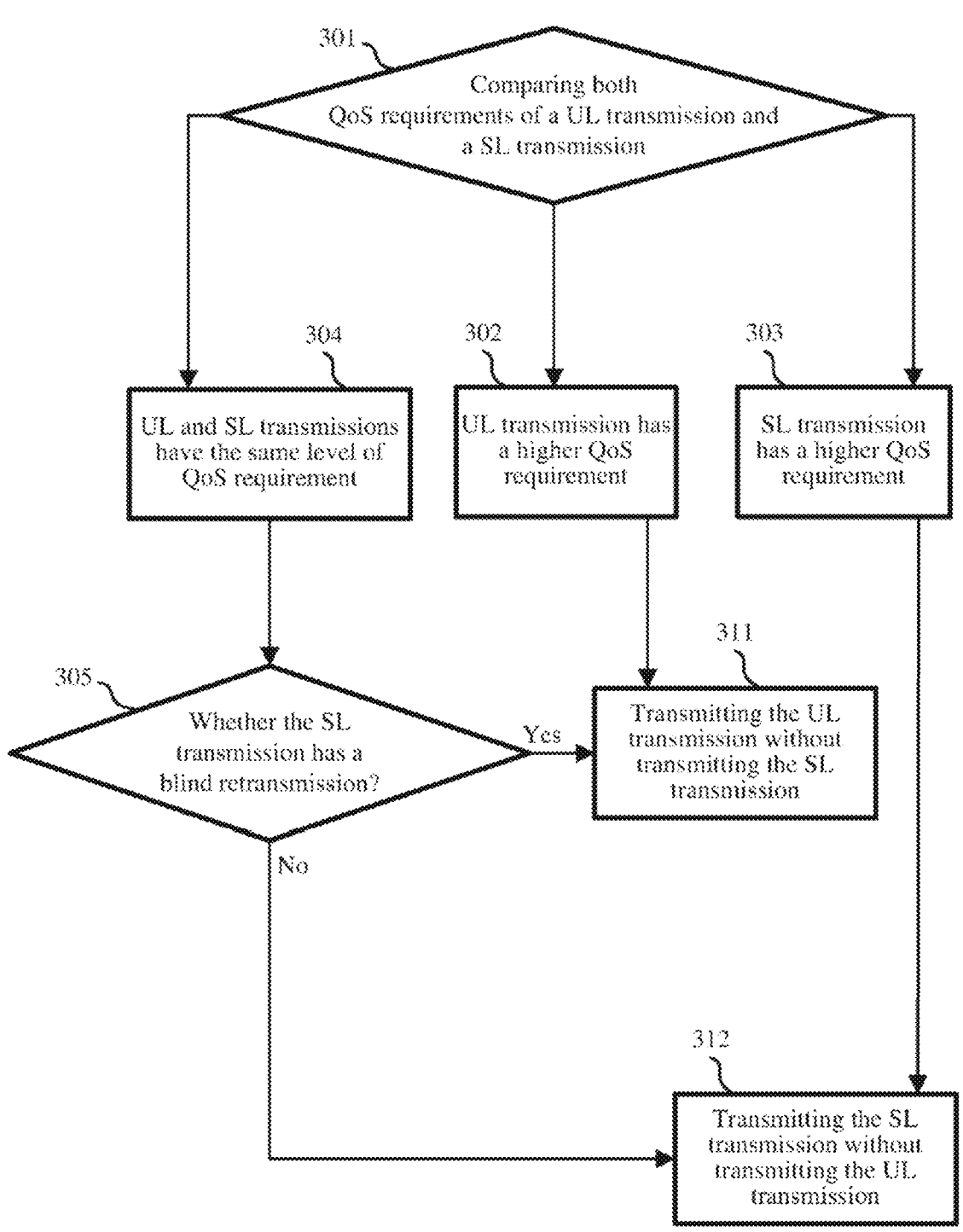
Figures 2, 3:
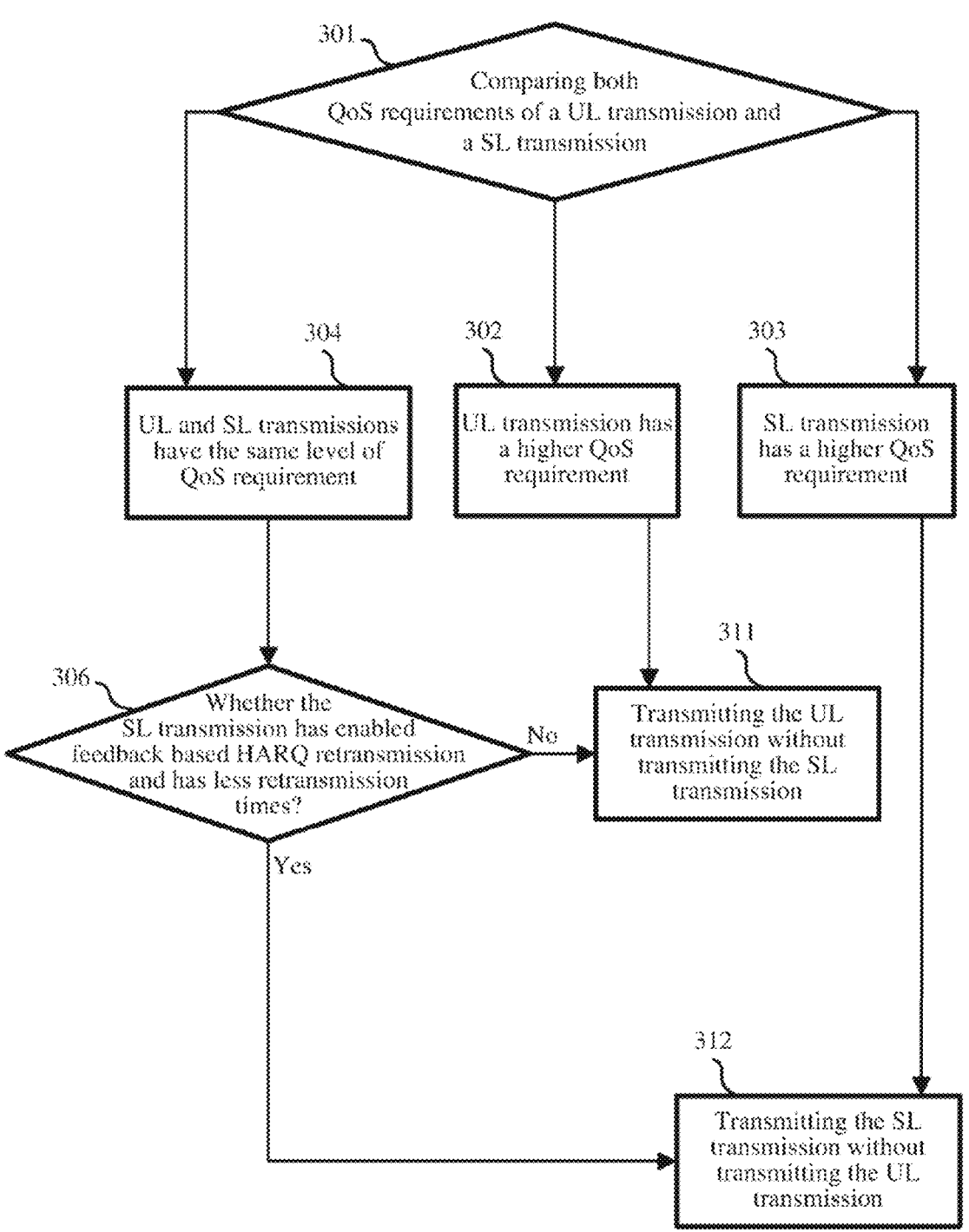
Figure 3:
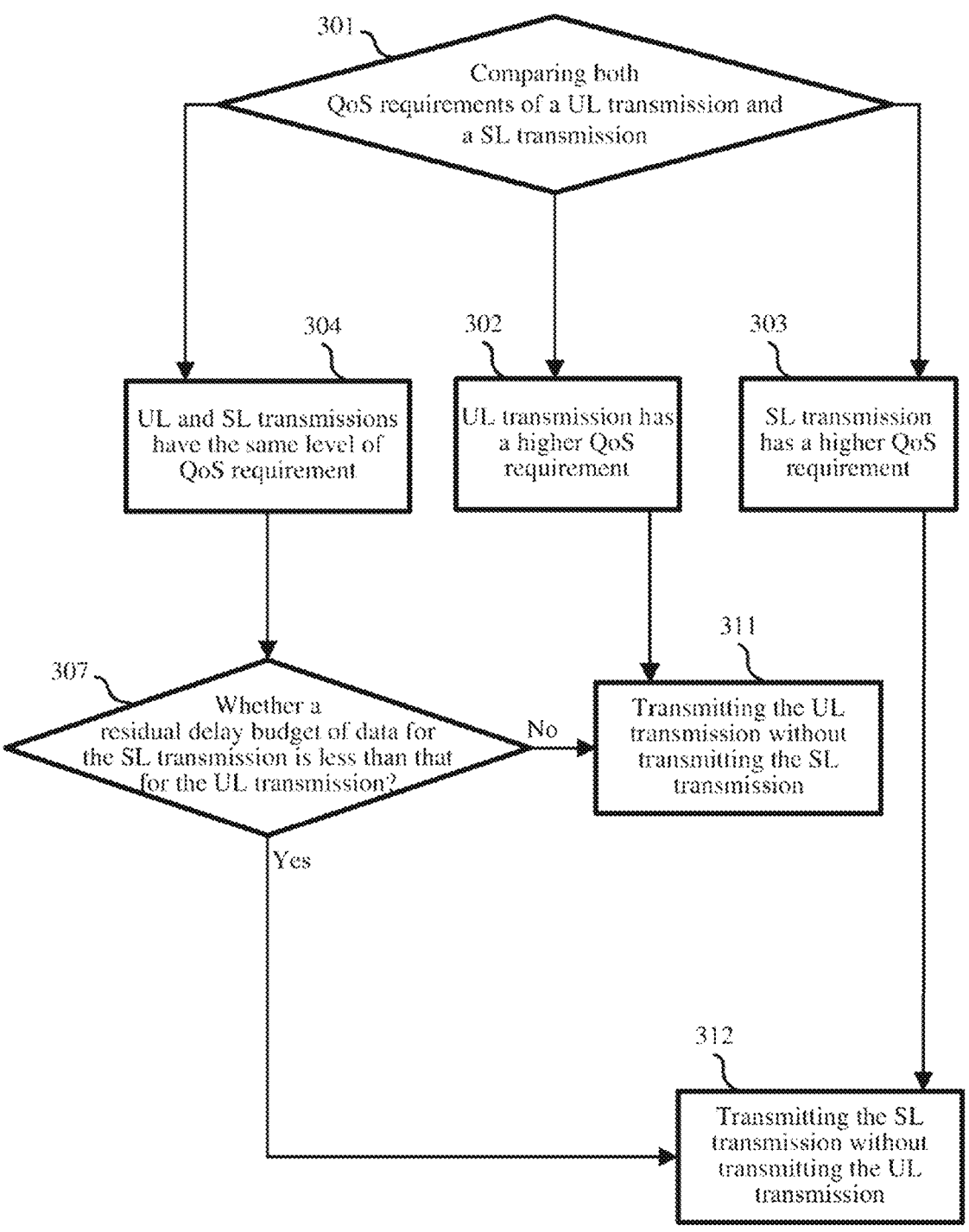

FIG. 2 illustrates a flow chart of a method for controlling transmissions in accordance with some embodiments of the present application. Referring to FIG. 2, method 200 is performed by a UE (e.g., a Tx UE or UE 102 as illustrated and described with reference to FIG. 1) in some embodiments of the present application.

In operation 201, a UE (e.g., UE 102 as illustrated and described with reference to FIG. 1) determines whether a UL transmission and a SL transmission overlap in time domain. The UL transmission is to be transmitted on an uplink between the UE and a base unit (e.g., BS 101 as illustrated and described with reference to FIG. 1). The SL transmission is to be transmitted on the sidelink between the UE and an Rx UE (e.g., UE 103, UE 104, UE 105, or UE 106 as illustrated and described with reference to FIG. 1).

In operation 202, in response to the UL transmission and the SL transmission overlapping in time domain, the transmission control scheme is applied. In some embodiments, the transmission control scheme includes that the UE determines, based on a QoS requirement of the UL transmission and that of the SL transmission, transmitting which one of the UL transmission and the SL transmission and not transmitting the other one of the UL transmission and the SL transmission. In a preferred embodiment, the SL transmission is dropped if the UL transmission is transmitted; and the UL transmission is dropped if the SL transmission is transmitted.

In some embodiments of the present application, a QoS requirement of each of UL and SL transmissions comprise: PC5 5QI (PQI), a resource type, a priority level, a packet delay budget (PDB), a packet error rate (PER), an averaging window for GBR, an averaging window for delay-critical GBR, a maximum data burst volume (MDBV) for delay-critical GBR, guaranteed flow bit rate (GFBR), a maximum flow bit rate (MFBR), PC5 link aggregate maximum bit rate (LINK-AMBR), a communication range, and/or a logical channel priority level. For instance, the resource type is at least one of guaranteed bit rate (GBR), delay-critical GBR, and non-GBR.

The details described in all the following embodiments of the present application (for example, how to take into account QoS requirements for both services on UL and SL when prioritize UL and SL transmissions; how to utilize a common solution to handle a case in which a UL transmission contains a high priority MAC CE when determining prioritizing which one of the UL and SL transmissions, how to handle a case in which a UL transmission is a scheduling request (SR), instead of data, when determining prioritizing which one of the UL and SL transmissions, and how to handle a case in which a SL transmission comprises HARQ feedback information, instead of data, when determining prioritizing which one of the UL and SL transmissions) are applicable for the embodiments as shown in FIG. 2.

FIGS. 3-1 to 3-5 illustrate further flow charts of the transmission control scheme of the present application.

The embodiments of FIGS. 3-1 to 3-5 introduce a transmission control scheme which takes into account QoS requirements for both services on UL and SL, when a UL transmission and a SL transmission happen to overlap in time domain for a Tx UE. The transmission control scheme in the embodiments as shown in FIGS. 3-1 to 3-5 compares both a QoS requirement of a UL transmission and a QoS requirement of a SL transmission, in order to determine prioritizing which one of the UL and SL transmissions.

For instance, if a SL transmission has higher priority level than a UL transmission, the SL transmission may be prioritized. If a SL transmission has a lower priority level than a UL transmission, the UL transmission may be prioritized. If the SL and UL transmissions have the same priority level, one or more other parameters or conditions may be considered, so as to determine prioritizing which transmission. For example, in order to determine prioritizing which one of the UL and SL transmissions, a HARQ related parameter for UL and SL transmissions may be considered. Configuration from a BS for UL and SL transmissions may be compared. Alternatively, other QoS parameter(s) for UL and SL transmissions may be compared.

In some embodiments of the present application, when a UL transmission and a SL transmission happen to overlap in time domain at a UE, but the UE cannot transmit the overlapping UL and SL transmissions at the same time, and moreover, the UL transmission is not prioritized by an upper layer of the UE and also not for Msg3 transmission, the UE may compare a QoS requirement of the UL transmission and a QoS requirement of the SL transmission, and then determine, according to specific rules described in the present application (e.g., the embodiments as shown in FIGS. 2-6), transmitting which one of the UL and SL transmissions and not transmitting the other one of the UL and SL transmissions.

In some embodiments of the present application, the UE compares a QoS parameter of the UL transmission configured by a BS and that of the SL transmission configured by a BS, and then transmits one of the UL transmission and the SL transmission and not transmitting the other based on the comparison result.

It is noted that more than one embodiments are provided to determine which one of the UL transmission and the SL transmission should be transmitted if the UL transmission and the SL transmission have the same level of QoS requirement. Those embodiments are explained in the following descriptions with reference to FIGS. 3-1 to 3-5.

Specifically, in the embodiments as shown in FIG. 3-1, in block 301, a UE (e.g., UE 102 as illustrated and described with reference to FIG. 1) compares both the QoS requirement of a UL transmission and the QoS requirement of a SL transmission.

In block 302, it is determined that the QoS requirement of the UL transmission is higher than the QoS requirement of the SL transmission, the UE then transmits the UL transmission without transmitting the SL transmission, as illustrated with reference to block 311.

In block 303, it is determined that the QoS requirement of the SL transmission is higher than the QoS requirement of the UL transmission, the UE then transmits the SL transmission without transmitting the UL transmission, as illustrated with reference to block 312.

In some embodiments of the present application, both of the UL transmission and the SL transmission associated with a plurality of logical channels. The UE may compare a value of the highest priority level of the SL logical channel(s) in a Media Access Control (MAC) Protocol Data Unit (PDU) to a value of the highest priority level of the UL logical channel(s) in the MAC PDU. If a less value of a priority level means a higher priority level, in response to a value of the highest priority level of the SL logical channel(s) in a MAC PDU being less than a value of the highest priority level of the UL logical channel(s) in the MAC PDU, a SL transmission is prioritized over a UL transmission. Otherwise, in response to the value of the highest priority level of the SL logical channel(s) in the MAC PDU being greater than the value of the highest priority level of the uplink logical channel(s) in the MAC PDU, the UL transmission is prioritized over the SL transmission.

Alternatively, if a greater value of a priority level means a higher priority, in response to a value of the highest priority of the SL logical channel(s) in a MAC PDU being greater than a value of the highest priority of the uplink logical channel(s) in the MAC PDU, a SL transmission is prioritized over a UL transmission. Otherwise, in response to the value of the highest priority of the SL logical channel(s) in the MAC PDU being less than the value of the highest priority of the uplink logical channel(s) in the MAC PDU, the UL transmission is prioritized over the SL transmission.

In some embodiments of the present application, a priority level of UL logical channel(s) in a MAC PDU refers to a priority level of logical channels of a data part in the MAC PDU (e.g. a MAC Service Data Unit (SDU)), rather than a priority level of logical channels of a MAC control element (CE) in the MAC PDU.

In block 304, it is determined that the UL transmission and the SL transmission having the same level of QoS requirement, the UE further determines whether the SL transmission has a blind retransmission in block 305. If "YES," in response to the SL transmission having a blind retransmission, the UE transmits the UL transmission and not transmitting the SL transmission, as illustrated with reference to block 311. If "NO," in response to the SL transmission not having a blind retransmission, the UE transmits the SL transmission and not transmitting the UL transmission, as illustrated with reference to block 312.

In the embodiment of FIG. 3-2, all blocks are the same as those in FIG. 3-1 except block 306. In FIG. 3-2, if the UL transmission and the SL transmission have the same level of QoS requirement, the UE may determine whether the SL transmission has enabled feedback based HARQ retransmission and has less retransmission times than that of the UL transmission in block 306. If "YES," in response to the SL transmission having enabled feedback based HARQ retransmission and less retransmission times, the UE transmits the SL transmission and not transmitting the UL transmission, as illustrated with reference to block 312. If "NO," in response to the SL transmission not having enabled feedback based HARQ retransmission and less retransmission times, the UE transmits the UL transmission and not transmitting the SL transmission, as illustrated with reference to block 311.

In the embodiment of FIG. 3-3, all blocks are the same as those in FIG. 3-1 except block 307. In FIG. 3-3, if the UL transmission and the SL transmission have the same level of QoS requirement, the UE may determine whether a residual delay budget of data for the SL transmission is less than a residual delay budget of data for the UL transmission in block 307. If "YES," i.e., the residual delay budget of data for the SL transmission is less than the residual delay budget of data for the UL transmission, the UE transmits the SL transmission and not transmitting the UL transmission, as illustrated with reference to block 312. If "NO," in response to the residual delay budget of data for the SL transmission not being less than the residual delay budget of data for the UL transmission, the UE transmits the UL transmission and not transmitting the SL transmission, as illustrated with reference to block 311.

Figures 3, 4:
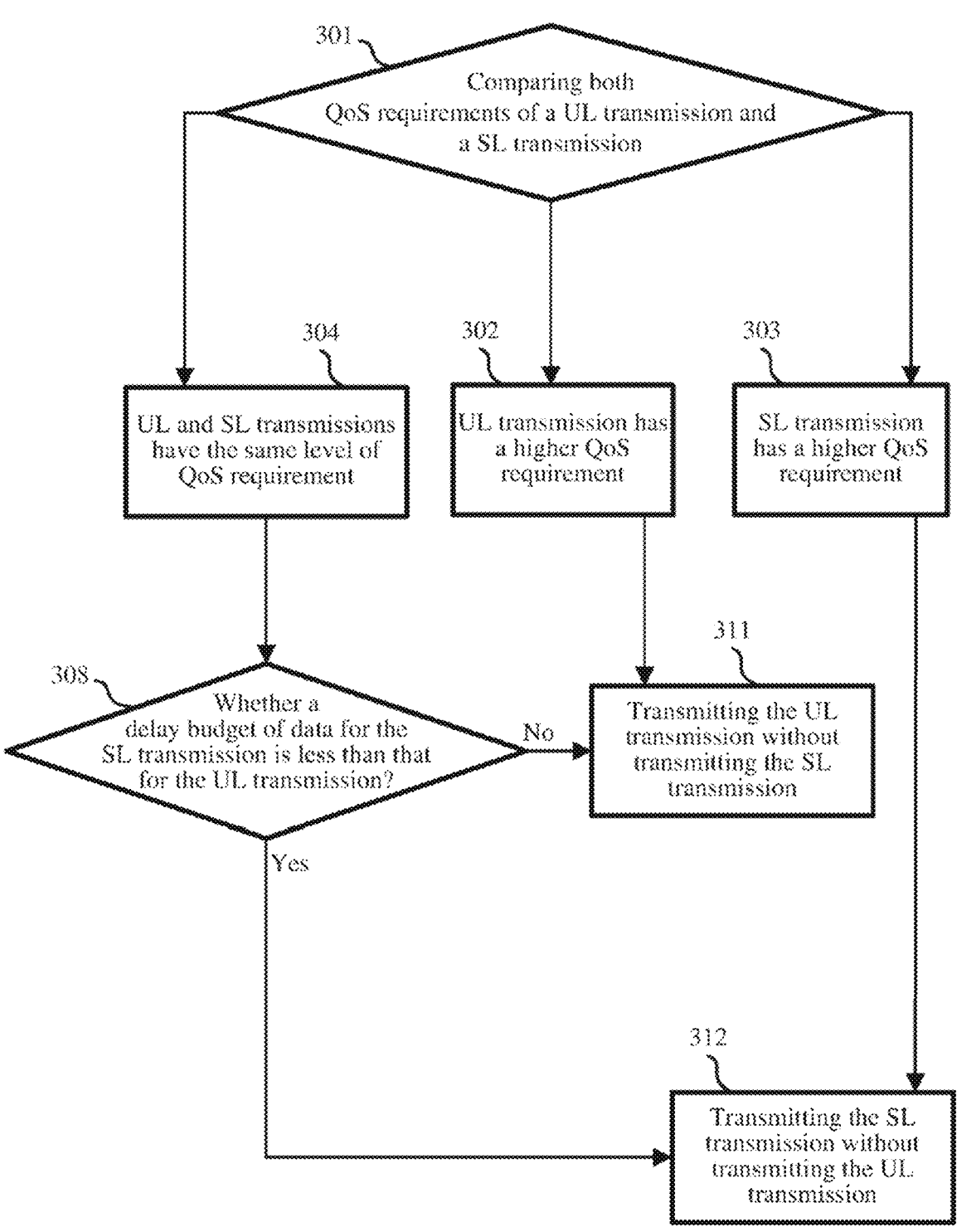

In the embodiment of FIG. 3-4, all blocks are the same as those in FIG. 3-1 except block 308. In FIG. 3-4, if the UL transmission and the SL transmission have the same level of QoS requirement, the UE may determine whether a delay budget of data for the SL transmission is less than a delay budget of data for the UL transmission in block 308. If "YES," i.e., the delay budget of data for the SL transmission is less than the delay budget of data for UL transmission, the UE transmits the SL transmission and not transmitting the UL transmission, as illustrated with reference to block 312. If "NO," in response to the delay budget of data for the SL transmission not being less than the delay budget of data for UL transmission, the UE transmits the UL transmission and not transmitting the SL transmission, as illustrated with reference to block 311.

Figures 3, 4, 5:
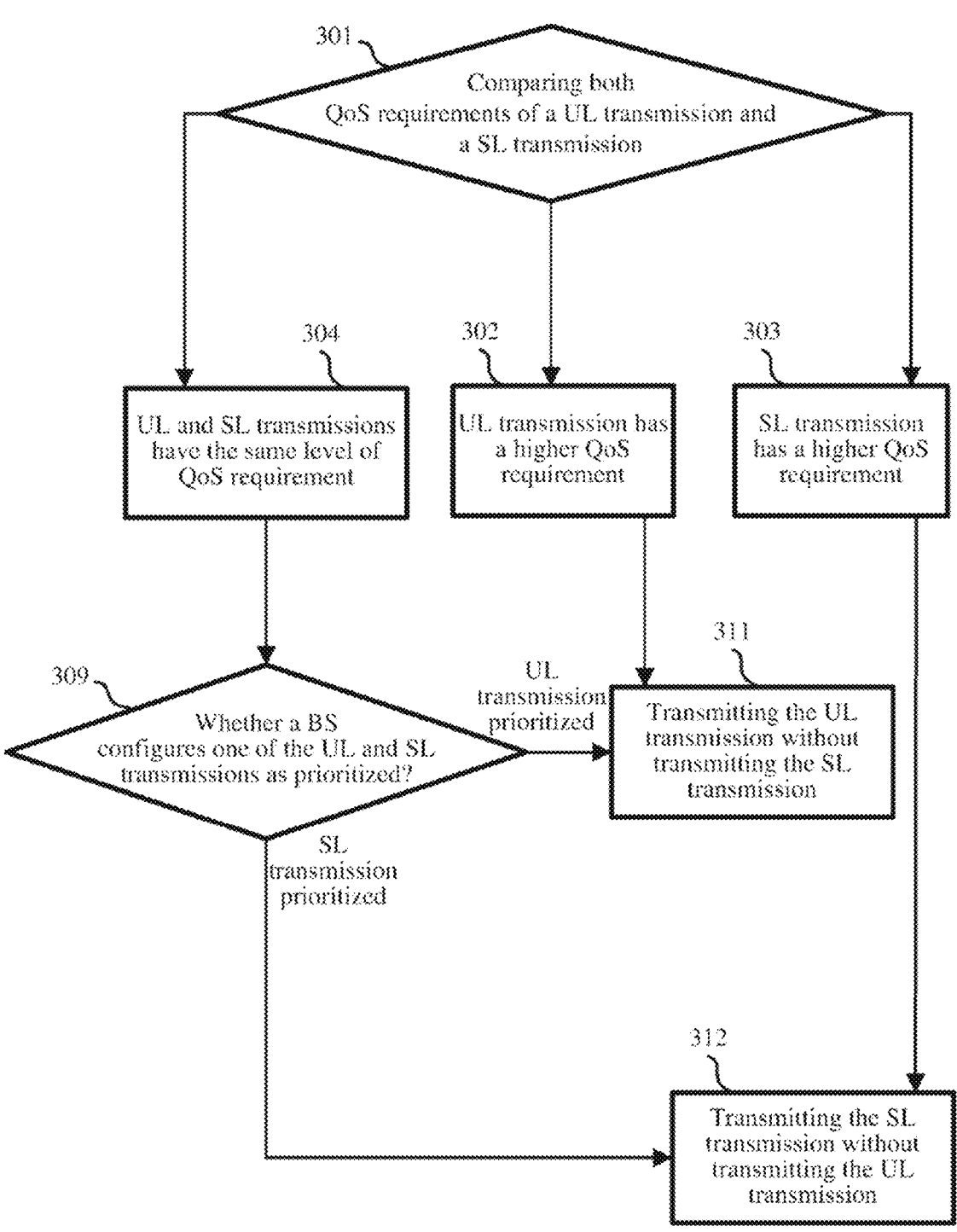
Figure 4:
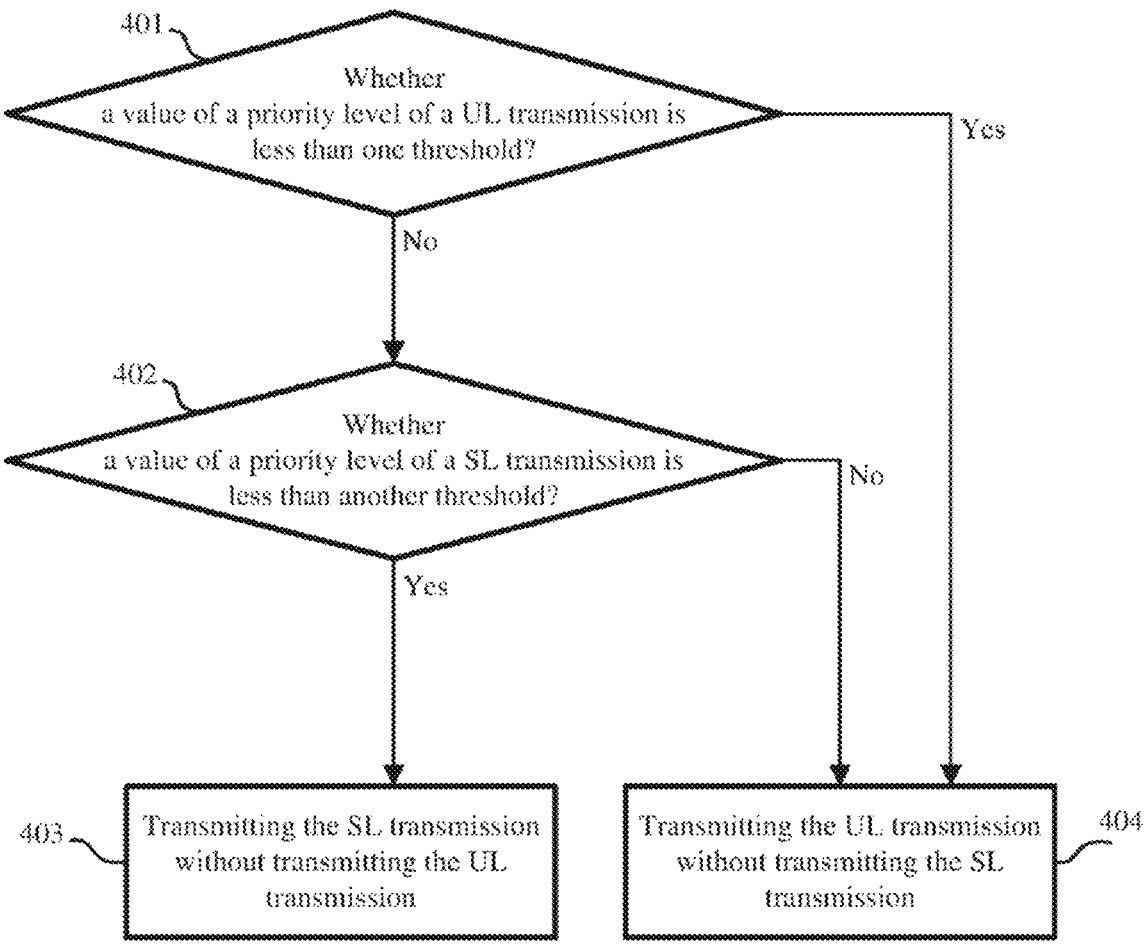
Figure 5:
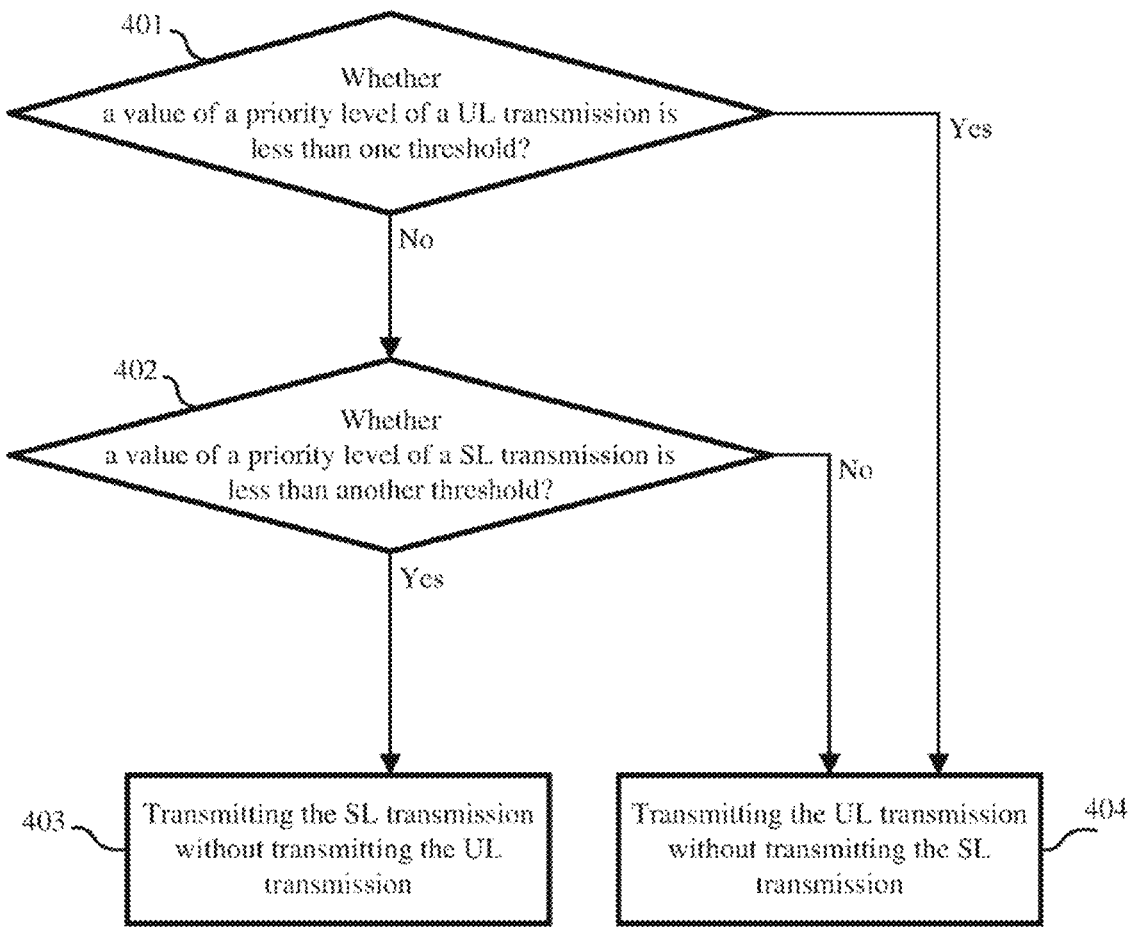

In the embodiment of FIG. 3-5, all blocks are the same as those in FIG. 3-1 except block 309. In FIG. 3-5, if the UL transmission and the SL transmission have the same level of QoS requirement the UE may determine whether a BS configures one of the UL and SL transmissions as prioritized in block 309, and then transmit the prioritized transmission. For example, in response to a BS configuring the UL transmission as prioritized, the UE may transmit the UL transmission and not transmitting the SL transmission, as illustrated with reference to block 311. In response to a BS configuring the SL transmission as prioritized, the UE may transmit the SL transmission and not transmitting the UL transmission, as illustrated with reference to block 312.

In some other embodiments of the present application, the UE may transmit the UL transmission and not transmitting the SL transmission based on a default setting if a UL transmission and a SL transmission happen to overlap in time domain for a Tx UE.

FIG. 4 illustrates another flow chart of a transmission control scheme in accordance with some embodiments of the present application.

The embodiments as shown in FIG. 4 introduce a transmission control scheme which takes into account priority levels for both services on UL and SL, when a UL transmission and a SL transmission happen to overlap in time domain for a Tx UE. The transmission control scheme in the embodiments as shown in FIG. 4 compares values of priority levels of UL and SL transmissions, in order to determine prioritizing which one of the UL and SL transmissions.

The embodiments as shown in FIG. 4 assume that a less value of a priority level means a higher priority level. It is contemplated that, in accordance with some other embodiments of the present application, a greater value of a priority level means a higher priority, and such embodiments are similar to the embodiments as shown in FIG. 4.

Specifically, in the embodiments as shown in FIG. 4, in block 401, a UE (e.g., UE 102 as illustrated and described with reference to FIG. 1) determines whether a value of a priority level of a UL transmission is less than one threshold.

If "YES," in response to the value of a priority level of the UL transmission being less than the threshold, the UE transmits the UL transmission and not transmitting the SL transmission, as illustrated with reference to block 404. If "NO," in response to the value of a priority level of the UL transmission being not less than the threshold, the UE further determines whether a value of a priority level of a SL transmission is less than another threshold, as illustrated with reference to block 402.

Then, if "YES," in response to the value of a priority level of the SL transmission being less than the abovementioned another threshold, the UE transmits the SL transmission and not transmitting the UL transmission, as illustrated with reference to block 403. If "NO," in response to the value of a priority level of the SL transmission being not less than the abovementioned another threshold, the UE transmits the UL transmission and not transmitting the SL transmission, as illustrated with reference to block 404.

In some embodiments of the present application, in block 401, the UE compares a value of the highest priority of the UL logical channel(s) in a MAC PDU to a threshold that is configured by an upper layer of the UE. If "YES," in response to the value of the highest priority of the UL logical channel(s) in a MAC PDU being less than the value of the threshold that is configured by the upper layer of the UE, the UL transmission is prioritized over the SL transmission. If "NO," in block 402, the UE further compares a value of the highest priority of the SL logical channel(s) in a MAC PDU to another threshold that is configured by the upper layer of the UE. If "YES," in response to the value of the highest priority of the SL logical channel(s) in a MAC PDU being less than the abovementioned threshold that is configured by the upper layer of the UE, the SL transmission is prioritized over the UL transmission. If "NO," in response to the value of the highest priority of the SL logical channel(s) in a MAC PDU not being less than the abovementioned threshold that is configured by the upper layer of the UE, the UL transmission is prioritized over the SL transmission.

It is contemplated that a priority level of a UL transmission may be associated with a QoS requirement of a UL transmission or configured by a BS. For one example, a priority level of a UL transmission may be the priority level in 5QI table for the service associated with the UL transmission. For a further example, a priority level of a UL transmission may be a priority level of a logical channel of the UL transmission which is configured by a BS.

It is contemplated that a priority level of a SL transmission may be associated with a QoS requirement of a SL transmission or configured by a BS. For example, a priority level of a SL transmission may be the priority level in PQI table for the service that is associated with the SL transmission. For another example, a priority level of a SL transmission may be a priority level of a logical channel of the SL transmission which is configured by a BS.

FIG. 5 illustrates another flow chart of a transmission control scheme in accordance with some embodiments of the present application.

The embodiments as shown in FIG. 5 introduce a transmission control scheme which takes into account a logical channel (LCH) in a UL transmission and a QoS requirement for a service on SL, when the UL transmission and a SL transmission happen to overlap in time domain for a Tx UE. In particular, the transmission control scheme in the embodiments as shown in FIG. 5 checks whether a UL transmission contains one or more LCHs that are prioritized by an upper layer of a UE. If there is no such prioritized LCHs, the UE further compares a QoS requirement of SL transmission and a threshold that is configured by the upper layer of the UE, in order to determine prioritizing which one of the UL and SL transmissions.

The embodiments as shown in FIG. 5 assume that a less value of a priority level means a higher priority level. It is contemplated that, in accordance with some other embodiments of the present application, a greater value of a priority level means a higher priority, and such embodiments are similar to the embodiments as shown in FIG. 5.

Specifically, in the embodiments as shown in FIG. 5, in block 501, a UE (e.g., UE 102 as illustrated and described with reference to FIG. 1) determines whether a UL transmission contains one or more specific LCHs prioritized by an upper layer of a UE.

If "YES," in response to the UL transmission containing one or more specific LCHs, the UE transmits the UL transmission and not transmitting the SL transmission, as illustrated with reference to block 504. If "NO," in response to the UL transmission not containing one or more specific LCHs, the UE further determines whether a value of a priority level of a SL transmission is less than one threshold, as illustrated with reference to block 502.

Then, if "YES," in response to the value of a priority level of the SL transmission being less than the threshold, the UE transmits the SL transmission and not transmitting the UL transmission, as illustrated with reference to block 503. If "NO," in response to the value of a priority level of the SL transmission being not less than the threshold, the UE transmits the UL transmission and not transmitting the SL transmission, as illustrated with reference to block 504.

In some particular embodiments, in block 501, the UE determines whether UL logical channel(s) in a MAC PDU is in a list of prioritized logical channels that is configured by an upper layer of the UE. If "YES," in response to the UL logical channel(s) in a MAC PDU being in the list, the UL transmission is prioritized over the SL transmission. If "NO," in response to the UL logical channel(s) in a MAC PDU not being in the list, the UE further determines whether a value of the highest priority of SL logical channel(s) in the MAC PDU is less than a threshold that is configured by the upper layer of the UE in block 502. If "YES," in response to the value of the highest priority of the SL logical channel(s) in the MAC PDU being less than the threshold that is configured by the upper layer of the UE, the SL transmission is prioritized over the UL transmission. If "NO," in response to the value of the highest priority of the SL logical channel(s) in the MAC PDU being not less than the threshold that is configured by the upper layer of the UE, the UL transmission is prioritized over the SL transmission.

Figure 6:
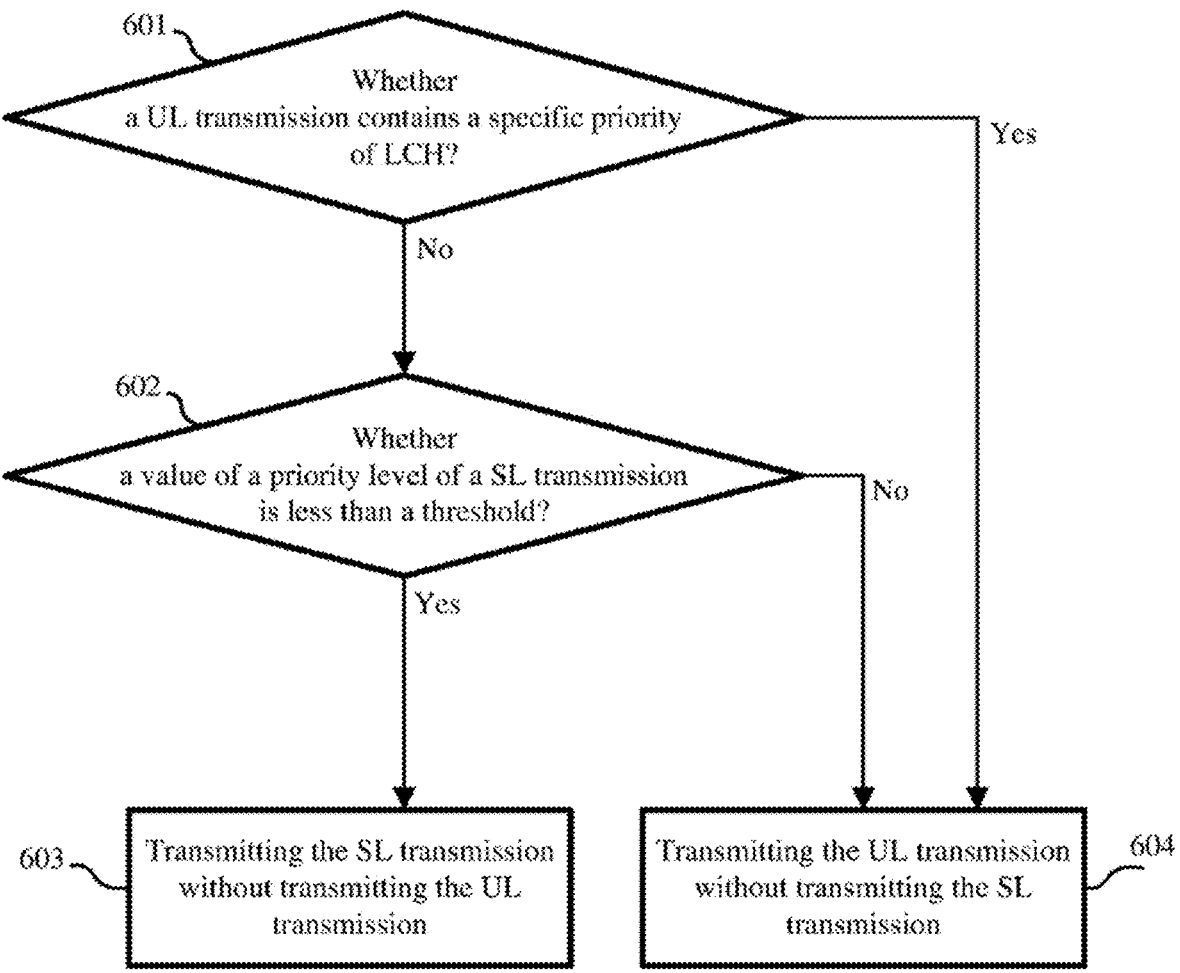
FIG. 6 illustrates another flow chart of a transmission control scheme in accordance with some embodiments of the present application.

FIG. 6 illustrates another flow chart of a transmission control scheme in accordance with some embodiments of the present application.

The embodiments as shown in FIG. 6 introduce a transmission control scheme which takes into account a prioritized logical channel priority in a UL transmission and a QoS requirement for a service on SL, when the UL transmission and a SL transmission happen to overlap in time domain for a Tx UE. In particular, the transmission control scheme in the embodiments as shown in FIG. 6 checks whether a UL transmission contains a logical channel with a specific priority level that is configured by an upper layer of a UE. If there is no such logical channel with a specific priority level, the UE further compares a QoS requirement of a SL transmission and a threshold that is configured by the upper layer of the UE, in order to determine prioritizing which one of the UL and SL transmissions.

The embodiments as shown in FIG. 6 assume that a less value of a priority level means a higher priority level. It is contemplated that, in accordance with some other embodiments of the present application, a greater value of a priority level means a higher priority, and such embodiments are similar to the embodiments as shown in FIG. 6.

Specifically, in the embodiments as shown in FIG. 6, in block 601, a UE (e.g., UE 102 as illustrated and described with reference to FIG. 1) determines whether a UL transmission contains a logical channel with a specific priority level.

If "YES," in response to the UL transmission containing a specific priority of LCH, the UE transmits the UL transmission and not transmitting the SL transmission, as illustrated with reference to block 604. If "NO," in response to the UL transmission not containing a specific priority of LCH, the UE further determines whether a value of a priority level of a SL transmission is less than a threshold, as illustrated with reference to block 602.

Then, if "YES," in response to the value of a priority level of a SL transmission being less than the threshold, the UE transmits the SL transmission and not transmitting the UL transmission, as illustrated with reference to block 603. If "NO," in response to the value of a priority level of a SL transmission being not less than the threshold, the UE transmits the UL transmission and not transmitting the SL transmission, as illustrated with reference to block 604.

In some particular embodiments, in block 601, the UE determines whether a priority of UL logical channel(s) in a MAC PDU is in a list of prioritized logical channel priorities that is configured by an upper layer of a UE. If "YES," in response to the priority of UL logical channel(s) in the MAC PDU being in the list, the UL transmission is prioritized over the SL transmission. If "NO," in response to the priority of UL logical channel(s) in the MAC PDU not being in the list, the UE further determines whether a value of the highest priority of the SL logical channel(s) in the MAC PDU is less than a threshold that is configured by the upper layer of the UE in block 602. If "YES," in response to the value of the highest priority of the SL logical channel(s) in the MAC PDU being less than a threshold that is configured by the upper layer of the UE, the SL transmission is prioritized over the UL transmission. If "NO," in response to the value of the highest priority of the SL logical channel(s) in the MAC PDU being not less than a threshold that is configured by the upper layer of the UE, the UL transmission is prioritized over the SL transmission.

FIGS. 2-6 provide some common solutions for handling the situation that the UL transmission and a SL transmission happen to overlap in time domain for a Tx UE. More specifically, in some embodiments of the present application, a UE (e.g., UE 102 as illustrated and described with reference to FIG. 1) further determines whether the UL transmission is prioritized by an upper layer of the UE or for Msg3 transmission before operation 202 in FIG. 2, operation 301 in FIGS. 3-1 to 3-5, operation 401 in FIG. 4, operation 501 in FIG. 5 and operation 601 in FIG. 6. In response to the UL transmission being prioritized by the upper layer or for Msg3 transmission, the UE transmits the UL transmission and not transmit the SL transmission. In response to the UL transmission is not prioritized by the BS and not for Msg3 transmission, the UE determines whether the UL transmission or the SL transmission would be performed based on the QoS requirements of the UL transmission and the SL transmission.

The above common solutions can also be applied to the case in which a UL transmission contains a high priority MAC CE. For example, a special priority level of a MAC CE within a UL transmission may be defined or configured by a BS, and then the special priority level of the MAC CE is compared to QoS requirement(s) of the SL transmission or a threshold, in order to finally determining prioritizing which one of the UL and SL transmissions.

In particular, when a UE (e.g., UE 102 as illustrated and described with reference to FIG. 1) needs to transmit both a UL transmission and a SL transmission which overlap in time domain, but the UE cannot transmit the overlapping UL and SL transmissions at the same time, and moreover, the UL transmission is not prioritized by an upper layer of the UE and also not for Msg3 transmission, the UL transmission contains MAC CE(s), the UE may compare a QoS requirement of MAC CE(s) in the UL transmission and the SL transmission, or compare the QoS requirement of MAC CEs in UL transmission with a threshold that is configured by the upper layer of the UE, so as to determine, according to specific rules described in the present application (e.g., the embodiments as shown in FIGS. 3-1 to 3-5 and 4), transmitting which one of the UL and SL transmissions and not transmitting the other one of the UL and SL transmissions. That is, the operation 301 in FIGS. 3-1 to 3-5 or operation 401 in FIG. 4 may be replaced by comparing the QoS requirement of the MAC CE(s) in the UL transmission and the QoS requirement of the SL transmission.

In response to the UL transmission containing a MAC CE(s), the UE determines, based on a QoS requirement of the MAC CE(s) in the UL transmission and the QoS requirement of the SL transmission, transmitting which one of the UL transmission and the SL transmission and not transmitting the other one of the UL transmission and the SL transmission.

For instance, a QoS requirement of a MAC CE(s) includes a priority level of the MAC CE(s). A priority level of the MAC CE(s) may be: the highest priority level of one or more associated logical channels, the highest priority level of logical channel groups (LCG(s)), the highest priority level of SL LCGs, or a priority level of a LCH.

In some other embodiments, in response to the MAC CE(s) being a specific MAC CE(s) and the UL transmission contains the specific MAC CE(s), the UE transmits the UL transmission and not transmits the SL transmission. For example, the specific MAC CE(s) is defined in a wireless communication standard or configured by a BS. For a further example, the specific MAC CE(s) contains specific logical channel information configured by a BS. These embodiments may be performed with the common solutions shown in FIGS. 2-6. For example, the operation of determining whether the MAC CE(s) is a specific MAC CE(s) can be performed before operation 202 in FIG. 2, operation 301 in FIGS. 3-1 to 3-5, operation 401 in FIG. 4, operation 501 in FIG. 5 and operation 601 in FIG. 6.

A MAC CE may be at least one of: a buffer status report (BSR) MAC CE, a SL BSR MAC CE, a power headroom report (PHR), a configured grant (CG) confirmation MAC CE, and a recommended bit rate MAC CE.

It is contemplated that, a priority of a CG confirmation MAC CE may be defined as follows. For type 1 CG confirmation MAC CE, there is a parameter configuredGrantType1Allowed, which indicates whether the logical channel can be multiplexed to type 1 CG resource. Thus, the priority related to type 1 CG confirmation MAC CE may be specified as the highest priority of logical channel that is labeled with configuredGrantType1Allowed and has available data in buffer. For type 2 CG confirmation MAC CE, a UE will report a traffic pattern for type 2 CG scheduling in UEassistanceinformation, with a logical channel ID and a priority level. Thus, the priority related to type 2 CG confirmation MAC CE may be specified as the highest priority of logical channels that are reported to a BS and have available data in buffer.

It is contemplated that, a priority of a BSR MAC CE may be defined as the highest priority of priorities of LCGs. A priority of a LCG within the LCGs is the highest priority of LCHs in the LCG.

It is contemplated that, a priority of a SL BSR MAC CE may be defined as the highest priority of SL LCGs. A priority of a SL LCG within the SL LCGs is the highest priority of a SL LCH in the SL LCG.

It is contemplated that, a priority of a recommended bit rate MAC CE may be defined as a priority of a LCH which is the target logical channel for recommended bit rate which is configured by a BS.

It is contemplated that, a BS may configure which MAC CE is prioritized for a UE. The UE may check whether MAC CE(s) in a UL transmission is in a list of prioritized MAC CE(s) that is configured by an upper layer of the UE, and determine transmitting which one of the UL and SL transmissions. A BS may enable or disable a list of prioritized MAC CE(s).

For example, a UL transmission is always prioritized if the UL transmission contains a specific MAC CE(s). The specific MAC CE(s) can be defined in in a wireless communication standard or configured by a BS. For a further example, a UL transmission is prioritized if the UL transmission contains specific MAC CE(s), and the MAC CE(s) contains specific logical channel information that is configured by an upper layer of the UE.

Some embodiments of the present application provide a solution to handle a case in which a UL transmission is a scheduling request (SR), instead of data, when determining prioritizing which one of the UL and SL transmissions. Details described in all the foregoing embodiments of the present application are applicable for the embodiments of the solution to handle the case in which a UL transmission is a SR, instead of data.

Specifically, when a UL transmission and a SL transmission happen to overlap in time domain at a UE, but the UE cannot transmit the overlapping UL and SL transmissions at the same time, and moreover, the UL transmission is a SR that is transmitted on Physical uplink control channel (PUCCH), the UE may compare a QoS requirement of the SR and a QoS requirement of the SL transmission, or compare a QoS requirement of the SR with a threshold that is configured by an upper layer of the UE, in order to determine whether to transmit one of the UL and SL transmissions and not transmit the other one or whether to adjust power of the UL transmission or the SL transmission according to the rules described in the present application (e.g., the embodiments as shown in FIGS. 3-1 to 3-5 and 4). That is, the operation 301 in FIGS. 3-1 to 3-5 may be replaced by comparing the QoS requirement of the SR and the QoS requirement of the SL transmission; or operation 401 in FIG. 4 may be replaced by comparing the QoS requirement of the SR with a threshold.

More specifically, in some embodiments of the present application, a UE (e.g., UE 102 as illustrated and described with reference to FIG. 1) determines whether a UL transmission comprises a SR. In response to the UL transmission comprising a SR, determining, based on a QoS requirement of the SR and the QoS requirement of the SL transmission, transmitting which one of the UL transmission and the SL transmission and not transmitting the other one of the UL transmission and the SL transmission.

For example, a QoS requirement of the SR may be a priority level of the SR. A priority level of a SR may be defined as the highest priority level of one or more associated logical channels. The one or more associated logical channels comprise at least one of a UL logical channel and a SL logical channel, and the one or more logical channels are mapped to the SR and carry available data to be transmitted.

Some embodiments of the present application provide a solution to handle a case in which a SL transmission comprises HARQ feedback information, instead of data, when determining prioritizing which one of the UL and SL transmissions. Details described in all the foregoing embodiments of the present application are applicable for the embodiments of the solution to handle the case in which a SL transmission comprises HARQ feedback information, instead of data.

Specifically, when a UL transmission and a SL transmission happen to overlap in time domain at a UE, but the UE cannot transmit the overlapping UL and SL transmissions at the same time, and moreover, the UL transmission is not prioritized by an upper layer of the UE and also not for Msg3 transmission, and the SL transmission is the HARQ feedback transmission that is transmitted on Physical sidelink feedback channel (PSFCH), the UE may compare a QoS requirement of the UL transmission and a QoS requirement of the SL transmission, or compare the QoS requirement of the UL transmission with a threshold that is configured by the upper layer of the UE, in order to determine whether to transmit one of the UL and SL transmissions and not transmit the other one according to the rules described in the present application (e.g., the embodiments as shown in FIGS. 2-6).

More specifically, in some embodiments of the present application, a UE (e.g., UE 102 as illustrated and described with reference to FIG. 1) determines whether a UL transmission is prioritized by an upper layer of the UE or for Msg3 transmission. In response to the UL transmission being prioritized by the upper layer or for Msg3 transmission, the UE transmits the UL transmission and not transmit the SL transmission. In response to the UL transmission not being prioritized by the upper layer and not for Msg3 transmission, the UE further determines whether the SL transmission comprises a SL hybrid automatic repeat request (HARQ) feedback transmission.

In some embodiments of the present application, in response to the SL transmission comprising the SL HARQ feedback transmission, the UE further determines, based on the QoS requirement of the UL transmission and a QoS requirement of the SL HARQ feedback transmission, transmitting which one of the UL transmission and the SL transmission and not transmitting the other one of the UL transmission and the SL transmission.

For example, a QoS requirement of the SL HARQ feedback transmission includes a priority level of the SL HARQ feedback transmission. A priority level of the SL HARQ feedback transmission may be the highest priority level of one or more logical channels of MAC PDU, wherein the MAC PDU is associated with the SL HARQ feedback transmission.

In some embodiments of the present application, in response to the SL transmission comprising the SL HARQ feedback transmission, the UE transmits the UL transmission and not transmit the SL transmission based on the default settings.

Some embodiments of the present application provide a solution to handle a case in which a UL transmission happens in a secondary cell group (SCG) of dual connectivity when determining prioritizing which one of the UL and SL transmissions. This solution also considers a SCG UL transmission. For a case in which SCG UL and SL are in the same serving cell or after MCG UL and SL prioritization being completed, a UE should do SCG UL transmission and SL transmission prioritization.

Details described in all the foregoing embodiments of the present application are applicable for these embodiments of the solution to handle the case in which a UL transmission happens in a secondary cell group (SCG) of dual connectivity when determining prioritizing which one of the UL and SL transmissions.

Specifically, when a UL (e.g., UE 102 as illustrated and described with reference to FIG. 1) has a MCG UL transmission, a SCG UL transmission and a SL transmission overlap in time domain, the UE cannot transmit the overlapping UL and SL transmissions at the same time, and moreover, the UL transmission is not prioritized by an upper layer of the UE and also not for Msg3 transmission, several embodiments may be achieved.

More specifically, in some embodiments, the UE may compare a QoS requirement of the SCG UL transmission and a QoS requirement of the SL transmission if the SCG UL transmission and the SL transmission are in the same serving cell.

In some embodiments, the UE may compare a QoS requirement of the SCG UL transmission and the SL transmission after the UE has done a comparison of a MCG UL transmission and the SL transmission.

In some additional embodiments, the UE may compare a QoS requirement of the SCG UL transmission and the SL transmission if the SCG UL transmission and the SL transmission belong to the same RAT.

In some further embodiments, the UE may only compare a QoS requirement of the UL transmission and a QoS requirement of the SL transmission if the UL transmission and the SL transmission belong to the same RAT.

In some other embodiments, the UE may firstly compare a QoS requirement of the UL transmission and the SL transmission if the UL transmission and the SL transmission belong to the same RAT.

Some embodiments of the present application provide a solution to prioritize between a LTE SL transmission and a NR SL transmission. This solution also considers LTE SL and NR SL, and a special QoS parameter is used for NR SL in this solution. Details described in all the foregoing embodiments of the present application are applicable for the embodiments of the solution of determining prioritizing which one of a LTE SL transmission and a NR SL transmission.

Specifically, when a UL (e.g., UE 102 as illustrated and described with reference to FIG. 1) has a LTE SL transmission, and NR SL transmission overlaps with the LTE SL transmission in time domain, but UE cannot transmit the overlapping LTE SL and NR SL transmissions at the same time, the UE may compare a QoS requirement of the LTE SL transmission and a QoS requirement of the NR SL transmission, in order to determine whether to adjust or drop the LTE SL transmission or whether to adjust or drop the NR SL transmission.

For example, a QoS requirement of a LTE SL transmission or a QoS requirement of a NR SL transmission may be a priority level which is defined in PC5 5QI (PQI) table.

Figure 7:
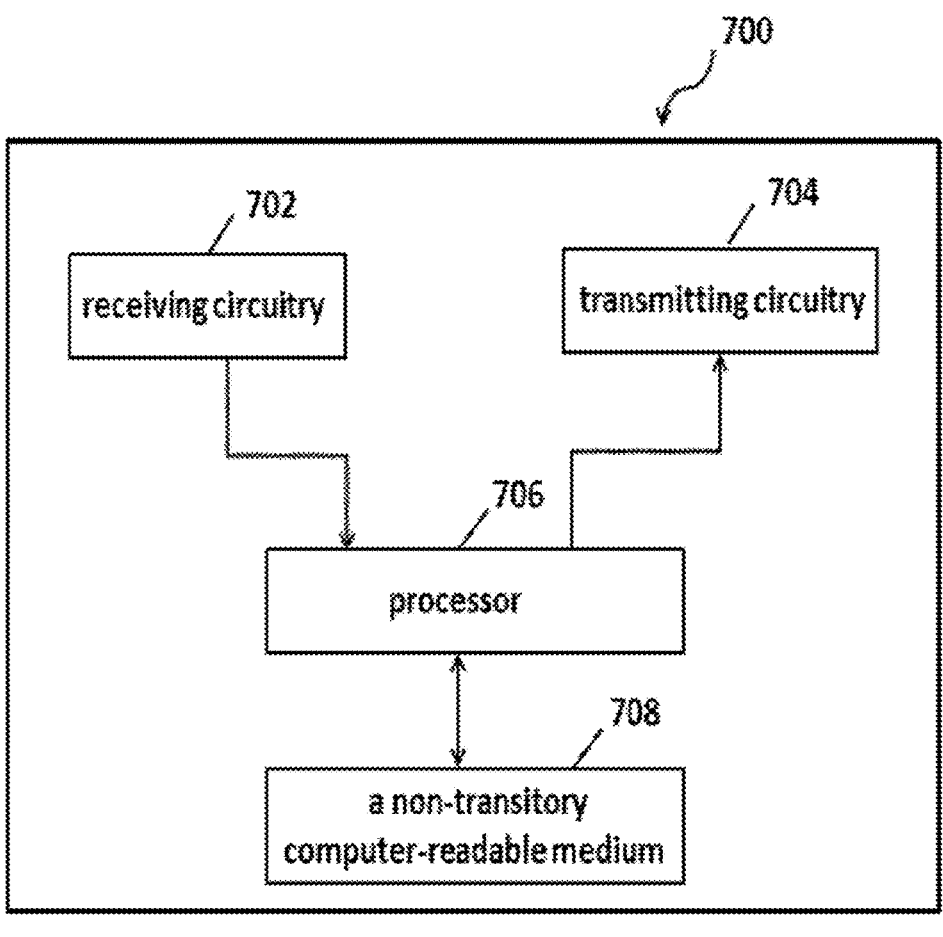
FIG. 7 illustrates a block diagram of an exemplary apparatus in accordance with some embodiments of the present application.

FIG. 7 illustrates a block diagram of an exemplary apparatus in accordance with some embodiments of the present application. Referring to FIG. 7, the apparatus 700 includes a non-transitory computer-readable medium 708, a receiving circuitry 702, a transmitting circuitry 704, and a processor 706. The processor 706 is coupled to the non-transitory computer-readable medium 708, the receiving circuitry 702, and the transmitting circuitry 704. The apparatus 700 may include a vehicle, a UE, a V2X UE or other device that is included in a vehicle platoon.

It is contemplated that some components are omitted in FIG. 7 for simplicity. In some embodiments, the receiving circuitry 702 and the transmitting circuitry 704 may be integrated into a single component (e.g., a transceiver).

In some embodiments, the non-transitory computer-readable medium 708 may have stored thereon computer-executable instructions to cause a processor to implement the operations with respect to the UE(s) as described above. For example, the computer-executable instructions may be executed to cause the processor 706 to control the receiving circuitry 702 and transmitting circuitry 704 to perform the operations with respect to the vehicle(s) as described and illustrated with respect to FIGS. 2-6.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method performed by a user equipment (UE), the method comprising:

determining that an uplink transmission and a sidelink transmission overlap in a time domain, wherein the uplink transmission includes a media access control-control element of a plurality of media access control-control elements;

determining that the uplink transmission lacks priority based at least in part on a value of a priority level associated with the uplink transmission, wherein the value of the priority level associated with the uplink transmission is associated with an upper layer of the UE;

in response to the uplink transmission and the sidelink transmission overlapping in the time domain and based at least in part on the uplink transmission lacking the priority, determining whether to transmit the uplink transmission or the sidelink transmission based at least in part on a comparison of a value of the priority level associated with the media access control-control element included in the uplink transmission to a first threshold and a value of a priority level associated with the sidelink transmission to a second threshold, wherein the value of the priority level associated with the uplink transmission is different from the first threshold and the second threshold; and transmitting, based at least in part on the comparison and based at least in part on a delay budget of data for the sidelink transmission being less than a delay budget of data for the uplink transmission, the sidelink transmission and not transmitting the uplink transmission.

2. The method of claim 1, wherein a resource type associated with one or more quality of service parameters of the sidelink transmission, and one or more quality of service parameters of the uplink transmission include at least one of a guaranteed bit rate, a delay-critical guaranteed bit rate, or a non-guaranteed bit rate, wherein the plurality of media access control-control elements comprise one or more of a buffer status report media access control-control element, a sidelink buffer status report media access control-control element, a power headroom report, a configured grant confirmation media access control-control element, or a recommended bit rate media access control-control element.

3. The method of claim 1, wherein determining whether to transmit the uplink transmission or the sidelink transmission comprises:

comparing one or more quality of service parameters of the uplink transmission and one or more quality of service parameters of the sidelink transmission; and if the one or more quality of service parameters of the uplink transmission are higher than the one or more quality of service parameters of the sidelink transmission, determining to transmit the uplink transmission and not transmitting the sidelink transmission;

if the one or more quality of service parameters of the sidelink transmission are higher than the one or more quality of service parameters of the uplink transmission, transmitting the sidelink transmission and not transmitting the uplink transmission; or in response to the one or more quality of service parameters of the uplink transmission being the same as the one or more quality of service parameters of the sidelink transmission, further determining whether to transmit the uplink transmission or the sidelink transmission based at least in part on one or more other conditions.

4. The method of claim 3, wherein the determining whether to transmit the uplink transmission or the sidelink transmission based at least in part on the one or more other conditions comprises:

determining whether the sidelink transmission has a blind retransmission; and in response to the sidelink transmission having the blind retransmission, determining to transmit the uplink transmission and to not transmit the sidelink transmission.

5. The method of claim 3, wherein the determining whether to transmit the uplink transmission or the sidelink transmission based at least in part on the one or more other conditions comprises:

transmitting the sidelink transmission and not transmitting the uplink transmission based at least in part on determining that the sidelink transmission has enabled feedback based at least in part on a hybrid automatic repeat request retransmission and has been retransmitted a lower number of times than the uplink transmission.

6. The method of claim 1, wherein the determining whether to transmit the uplink transmission or the sidelink transmission comprises:

in response to the value of the priority level associated with the media access control-control element included in the uplink transmission being less than the first threshold, determining to transmit the uplink transmission and not transmitting the sidelink transmission, wherein the priority level associated with the media access control-control element included in the uplink transmission is associated with one or more quality of service parameters associated with the media access control-control element or configured by a base station;

in response to the value of the priority level associated with the media access control-control element included in the uplink transmission being greater than the first threshold and the value of the priority level associated with the sidelink transmission being less than the second threshold, transmitting the sidelink transmission and not transmitting the uplink transmission, wherein the priority level associated with the sidelink transmission is associated with one or more quality of service parameters of the sidelink transmission or configured by the base station; or in response to the value of the priority level associated with the sidelink transmission being greater than the second threshold, determining to transmit the uplink transmission and not transmitting the sidelink transmission, wherein the priority level associated with the sidelink transmission is associated with the one or more quality of service parameters of the sidelink transmission or configured by the base station.

7. The method of claim 1, wherein the determining whether to transmit the uplink transmission or the sidelink transmission comprises:

determining whether the uplink transmission contains one or more specific logical channels;

in response to the uplink transmission containing the one or more specific logical channels, determining to transmit the uplink transmission and to not transmit the sidelink transmission;

in response to the uplink transmission not containing the one or more specific logical channels, comparing the value of the priority level of the sidelink transmission to the first threshold, wherein the priority level associated with the sidelink transmission is associated with one or more quality of service parameters of the sidelink transmission or configured by a base station; and in response to the value of the priority level associated with the sidelink transmission being less than the first threshold, transmitting the sidelink transmission and not transmitting the uplink transmission; or in response to the value of the priority level associated with the sidelink transmission being greater than the first threshold, determining to transmit the uplink transmission and to not transmit the sidelink transmission.

8. The method of claim 1, wherein the determining whether to transmit the uplink transmission or the sidelink transmission comprises:

determining whether the uplink transmission comprises a scheduling request; and in response to the uplink transmission comprising the scheduling request, determining, based at least in part on a quality of service requirement of the scheduling request and one or more quality of service parameters of the sidelink transmission, determining to transmit one of the uplink transmission or the sidelink transmission and to not transmit the other one of the uplink transmission or the sidelink transmission.

9. The method of claim 1, wherein transmitting the sidelink transmission and not transmitting the uplink transmission is based at least in part on the sidelink transmission having been retransmitted fewer times than the uplink transmission.

10. A processor for wireless communication, comprising:

at least one controller coupled with at least one memory and operable to cause the processor to:

determine that an uplink transmission and a sidelink transmission overlap in a time domain, wherein the uplink transmission includes a media access control-control element of a plurality of media access control-control elements;

determine that the uplink transmission lacks priority based at least in part on a value of a priority level associated with the uplink transmission;

in response to the uplink transmission and the sidelink transmission overlapping in the time domain and based at least in part on the uplink transmission lacking the priority, the uplink transmission based at least in part on the uplink transmission lacking priority, determine whether to transmit the uplink transmission or the sidelink transmission based at least in part on a comparison of a value of the priority level associated with the media access control-control element included in the uplink transmission to a first threshold and a value of a priority level associated with the sidelink transmission to a second threshold, wherein the value of the priority level associated with the uplink transmission is different from the first threshold and the second threshold; and transmit, based at least in part on the comparison and based at least in part on a delay budget of data for the sidelink transmission being less than a delay budget of data for the uplink transmission, the sidelink transmission and not transmitting the uplink transmission.

11. A user equipment (UE) for wireless communication, comprising:

at least one memory; and at least one processor coupled with the at least one memory and configured operable to cause the UE to:

determine that an uplink transmission and a sidelink transmission overlap in a time domain, the uplink transmission including a media access control-control element of a plurality of media access control-control elements;

determine that the uplink transmission lacks priority based at least in part on a value of a priority level associated with the uplink transmission, wherein the value of the priority level associated with the uplink transmission is associated with an upper layer of the UE;

in response to the uplink transmission and the sidelink transmission overlapping in the time domain and based at least in part on the uplink transmission lacking the priority, determining whether to transmit the uplink transmission or the sidelink transmission based at least in part on a comparison of a value of the priority level associated with the media access control-control element included in the uplink transmission to a first threshold and a value of a priority level associated with the sidelink transmission to a second threshold, wherein the value of the priority level associated with the uplink transmission is different from the first threshold and the second threshold; and transmit, based at least in part on the comparison and based at least in part on a delay budget of data for the sidelink transmission being less than a delay budget of data for the uplink transmission, the sidelink transmission and not transmit the uplink transmission.

12. The UE of claim 11, wherein a resource type associated with one or more quality of service parameters of the sidelink transmission and one or more quality of service parameters of the uplink transmission include at least one of a guaranteed bit rate, a delay-critical guaranteed bit rate, or a non-guaranteed bit rate.

13. The UE of claim 11, wherein to determine whether to transmit the uplink transmission or the sidelink transmission, the at least one processor is configured to cause the UE to:

compare one or more quality of service parameters of the uplink transmission and one or more quality of service parameters of the sidelink transmission; and determine to transmit the uplink transmission and not the sidelink transmission if the one or more quality of service parameters of the uplink transmission are higher than the one or more quality of service parameters of the sidelink transmission;

transmit the sidelink transmission and not the uplink transmission if the one or more quality of service parameters of the sidelink transmission are higher than the one or more quality of service parameters of the uplink transmission; or further determine whether to transmit the uplink transmission or the sidelink transmission based at least in part on one or more other conditions if the one or more quality of service parameters of the uplink transmission and the one or more quality of service parameters of the sidelink transmission are the same.

14. The UE of claim 13, wherein to determine whether to transmit the uplink transmission or the sidelink transmission based at least in part on the one or more other conditions, the at least one processor is configured to cause the UE to:

determine whether the sidelink transmission has a blind retransmission; and in response to the sidelink transmission having the blind retransmission, determine to transmit the uplink transmission and not the sidelink transmission.

15. The UE of claim 13, wherein to determine whether to transmit the uplink transmission or the sidelink transmission based at least in part on the one or more other conditions, the at least one processor is configured to cause the UE to:

transmit the sidelink transmission and not transmit the uplink transmission based at least in part on determining that the sidelink transmission has enabled feedback based at least in part on hybrid automatic repeat request retransmission and has been retransmitted a lower number of times than the uplink transmission.

16. The UE of claim 11, wherein to determine whether to transmit the uplink transmission or the sidelink transmission, the at least one processor is configured to cause the UE to:

determine to transmit the uplink transmission and not the sidelink transmission if the value of the priority level associated with the media access control-control element included in the uplink transmission is less than the first threshold, wherein the priority level associated with the media access control-control element included in the uplink transmission is associated with one or more quality of service parameters associated with the media access control-control element or configured by a base station; and transmit the sidelink transmission and not the uplink transmission if the value of the priority level associated with the media access control-control element included in the uplink transmission is greater than the first threshold and the value of the priority level associated with the sidelink transmission is less than the second threshold, wherein the priority level associated with the sidelink transmission is associated with one or more quality of service parameters of the sidelink transmission or configured by the base station; or determine to transmit the uplink transmission and not the sidelink transmission if the value of the priority level associated with the sidelink transmission is greater than the second threshold, wherein the priority level associated with the sidelink transmission is associated with the one or more quality of service parameters of the sidelink transmission or configured by the base station.

17. The UE of claim 11, wherein to determine whether to transmit the uplink transmission or the sidelink transmission, the at least one processor is configured to cause the UE to:

determine whether the uplink transmission contains one or more specific logical channels;

determine to transmit the uplink transmission and not the sidelink transmission if the uplink transmission contains the one or more specific logical channels;

compare the value of the priority level associated with the sidelink transmission to the first threshold based at least in part on the uplink transmission not containing the one or more specific logical channels, wherein the priority level associated with the sidelink transmission is associated with one or more quality of service parameters of the sidelink transmission or configured by a base station; and transmit the sidelink transmission and not the uplink transmission if the value of the priority level associated with the sidelink transmission is less than the first threshold; or determine to transmit the uplink transmission and not the sidelink transmission if the value of the priority level associated with the sidelink transmission is greater than the first threshold.

18. The UE of claim 11, wherein to determine whether to transmit the uplink transmission or the sidelink transmission, the at least one processor is configured to cause the UE to:

determine whether the uplink transmission comprises a scheduling request; and in response to the uplink transmission comprising the scheduling request, determine, based at least in part on a quality of service requirement of the scheduling request and one or more quality of service parameters of the sidelink transmission, to transmit one of the uplink transmission or the sidelink transmission and not transmit the other one of the uplink transmission or the sidelink transmission.

19. A method performed by a base station user equipment (UE), the method comprising:

determining that an uplink transmission and a sidelink transmission overlap in a time domain, wherein the uplink transmission includes a media access control-control element of a plurality of media access control-control elements;

determining that the uplink transmission lacks priority based at least in part on a value of a priority level associated with the uplink transmission;

in response to the uplink transmission and the sidelink transmission overlapping in the time domain and based at least in part on the uplink transmission lacking the priority, the uplink transmission based at least in part on the uplink transmission lacking priority, determining whether to transmit the uplink transmission or the sidelink transmission based at least in part on a comparison of a value of the priority level associated with the media access control-control element included in the uplink transmission to a first threshold and a value of a priority level associated with the sidelink transmission to a second threshold, wherein the value of the priority level associated with the uplink transmission is different from the first threshold and the second threshold; and transmitting, based at least in part on the comparison and based at least in part on the sidelink transmission being retransmitted fewer times than the uplink transmission, the sidelink transmission and not transmitting the uplink transmission.

20. The method of claim 19, wherein transmitting the sidelink transmission and not transmitting the uplink transmission is based at least in part on the sidelink transmission having enabled feedback based at least in part on a hybrid automatic repeat request retransmission.

* * * * *